United States Patent
Hakkaku

(10) Patent No.: US 10,695,975 B2
(45) Date of Patent: Jun. 30, 2020

(54) SHAPED OBJECT AND SHAPING METHOD

(71) Applicant: MIMAKI ENGINEERING CO., LTD., Nagano (JP)

(72) Inventor: Kunio Hakkaku, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 15/816,663

(22) Filed: Nov. 17, 2017

(65) Prior Publication Data

US 2018/0178444 A1    Jun. 28, 2018

(30) Foreign Application Priority Data

Dec. 27, 2016 (JP) ................... 2016-254178

(51) Int. Cl.

| | |
|---|---|
| *B29C 64/00* | (2017.01) |
| *B29C 64/112* | (2017.01) |
| *B41J 2/01* | (2006.01) |
| *B29C 64/393* | (2017.01) |
| *B33Y 80/00* | (2015.01) |
| *B33Y 10/00* | (2015.01) |
| *B29C 64/40* | (2017.01) |

(52) U.S. Cl.
CPC .......... *B29C 64/112* (2017.08); *B29C 64/393* (2017.08); *B41J 2/01* (2013.01); *B29C 64/40* (2017.08); *B29K 2995/002* (2013.01); *B33Y 10/00* (2014.12); *B33Y 80/00* (2014.12)

(58) Field of Classification Search
CPC ....... B33Y 10/00; B29C 64/112; B29C 64/40; B29C 2009/00
USPC ...................................... 428/195.1
See application file for complete search history.

(56) References Cited

U.S. PATENT DOCUMENTS

| | | | |
|---|---|---|---|
| 2002/0167101 A1* | 11/2002 | Tochimoto | B29C 41/36 264/40.1 |
| 2015/0183160 A1* | 7/2015 | Ohnishi | B33Y 10/00 264/129 |
| 2018/0178444 A1* | 6/2018 | Hakkaku | B29C 64/112 |

* cited by examiner

*Primary Examiner* — Betelhem Shewareged
(74) *Attorney, Agent, or Firm* — Rankin, Hill & Clark LLP

(57) ABSTRACT

A shaped object formed by using a layering scheme, the shaped object including: a color region 11 having a uniform thickness from a surface toward an inside of the shaped object; and a light reflective region 12 arranged on an inner side of the color region 11, wherein, at a portion where ink in the color region does not satisfy a predetermined ink density by a sole use of color ink, an ink density of the color region 11 is supplemented with white ink. As the white ink, ink with 20% to 70% light transmittance of visible light is used.

11 Claims, 5 Drawing Sheets

SHAPED OBJECT AND SHAPING METHOD

CROSS REFERENCE TO RELATED APPLICATIONS

This application claims the priority benefit of Japanese Patent Application No. 2016-254178, filed on Dec. 27, 2016. The entirety of the above-mentioned patent application is hereby incorporated by reference herein and made a part of this specification.

TECHNICAL FIELD

The present disclosure relates to a method of shaping a three-dimensional object using a layered shaping method.

DESCRIPTION OF THE BACKGROUND ART

Conventionally, a shaping device that shapes a shaped object using inkjet heads (3D printer) has been known. In such a shaping device, a shaped object is shaped by layering plural ink layers formed by the inkjet heads, for example.

In a case of shaping a shaped object using inkjet heads, a shaped object colored with various colors can be shaped by using ink for coloring as materials of the shaping. By drawing various letters and patterns on a surface of a shaped object, the shaped object can be decorated in a variety of ways.

Further, when a shaped object is to be shaped as above, a light-reflective region (for example, a white region) may be formed within the shaped object, and colored regions may be formed surrounding this region. By configuring as above, various colors can be expressed, similarly to a case of printing on a white sheet of paper upon printing using an inkjet printer that prints two-dimensional images.

Japanese Unexamined Patent Publication 2015-147328 A is a document which describes a shaping method for forming a colored region around a light-reflective region, and is an application filed by the present inventor. In Japanese Unexamined Patent Publication 2015-147328 A, the inventor proposed an invention for supplementing an ink density by using supplementary ink at portions where an ink density of a colored layer is not sufficient by a sole use of colored ink.

SUMMARY

The invention described in Japanese Unexamined Patent Publication 2015-147328 A as aforementioned achieves an effect of being able to form desired decorations by realizing a uniform ink density by using the supplementary ink for supplementing dents and gaps that are generated when a decorative layer is formed only by decorative ink. With further studies and developments, the present inventor has now completed a shaped object and a shaping method that can supplement dents and gaps in a decorative layer using a simple configuration.

A shaped object of the present disclosure is a shaped object formed by using a layering scheme, the shaped object including: a color region having a uniform thickness along a normal direction from a surface toward an inside of the shaped object; and a light reflective region arranged on an inner side of the color region, wherein, at a portion where ink in the color region does not satisfy a predetermined ink density by a sole use of color ink, an ink density of the color region is supplemented with white ink.

As above, by supplementing the portion, where the ink in the color region does not satisfy the predetermined ink density by the sole use of the color ink, by the white ink, an undesirable occurrence of deteriorated appearance profile and color tone in the shaped object caused by dents, bumps, and gaps in the color region which may be generated due to insufficiency of the ink density can be prevented.

In the shaped object of the present disclosure, the supplementary ink may be same ink that configures the light reflective region. According to this configuration, types of materials can be commonalized. The thickness of the color region stays uniform even in a configuration that fills the light reflective region and the color region with same white ink, and as such, a color quality of the shaped object can be maintained uniformly.

The shaped object of the present disclosure may further include a body region arranged on an inner side of the light reflective region, and the supplementary ink may be same ink that configures the body region. According to this configuration, types of materials can be commonalized.

In the shaped object of the present disclosure, ink with 20% to 70% light transmittance of visible light may be used as the white ink. Here, 20% to 70% light transmittance means that when it is assumed that an entirety of the color region is configured of the white ink, a ratio by which the visible light permeates (permeating light intensity/incident light intensity) is 20% to 70%.

The white ink has a function to shield off light, and concentrated white color may hinder a color of the color region from being seen; however, in the present disclosure, since the white ink having 20% or more light transmittance is used, an influence imposed on the color of the color region can be mitigated. Further, by using the white ink having 70% or less light transmittance, the white ink that is identical to the supplementary ink can suitably be used in the light reflective region. It should be noted that, in a case where white ink with high light transmittance is to be used in the light reflective region, light reflectance of the light reflective region can be maintained high by thickening a thickness of the light reflective region in a light permeating direction.

It should be noted that the light transmittance of the visible light is used herein as an expression; however, if the expression is to be stated in terms of light reflectance, ink with 30% to 80% light reflectance may be used. As the supplementary ink, one with lower light reflectance is desirable, and as the ink for the light reflective region, one with higher light reflectance is desirable. Since the above preferences contradict with each other, an optimal value can be obtained by adjusting the thickness of the light reflective region. Here, 30% to 80% light reflectance means that when it is assumed that the entirety of the color region is configured of the white ink, a ratio by which the visible light reflects (reflected light intensity/incident light intensity) is 30% to 80%.

A shaping method of the present disclosure is a method of shaping a shaped object provided with a color region having a uniform thickness along a normal direction from a surface toward an inside of the shaped object using a layering scheme, the method including supplementing an ink density of the color region using white ink at a portion where ink in the color region does not satisfy a predetermined ink density with a sole use of color ink. Further, the ink density of the color region may be supplemented using white ink, which is same white ink as a light reflective region provided on an inner side of the color region. Further, white ink, which is same white ink that supplements a body region that is arranged on an inner side of the light reflective region and configuring a profile of the shaped object, may be used.

As above, by supplementing the portion, where the ink in the color region does not satisfy the predetermined ink density by the sole use of the color ink, by the white ink, the undesirable occurrence of the deteriorated appearance profile and color tone in the shaped object caused by the dents, bumps, and gaps in the color region which may be generated due to the insufficiency of the ink density can be prevented. Further, with the ink which is the same ink configuring the light reflective region and the body region being used as the supplementary ink, the types of materials can be commonalized, and an inkjet head ejecting the supplementary ink can be commonalized to reduce a number of the inkjet heads.

In the shaping method of the present disclosure, ink with 20% to 70% light transmittance may be used as the white ink.

Since the white ink having 20% or more light transmittance is used, the influence imposed on the color of the color region can be mitigated. Further, by using the white ink having 70% or less light transmittance, the white ink that is identical to the supplementary ink can suitably be used in the light reflective region and in the body region.

According to the present disclosure, an undesirable occurrence of deteriorated appearance profile and color tone in the shaped object caused by dents, bumps, and gaps in the color region which may be generated due to insufficiency of the ink density can be prevented.

DETAILED DESCRIPTION OF EMBODIMENTS

A shaped object of an embodiment of the present disclosure and a shaping method thereof will be described with reference to the drawings. It should be noted that, in the embodiment below, a configuration that uses an inkjet method as the shaping method of a shaped object will be described; however, the present disclosure is not limited to this scheme, and it may be applied to other schemes for forming a shaped object using a layering scheme. For example, it may be applied to a scheme in which a powdered material of a shaped object is spread out, and layers are formed therein by ejecting binder liquid using an inkjet method. In this case, a color of the binder liquid may be employed as a color of the ink in this scheme.

Figure 1A:
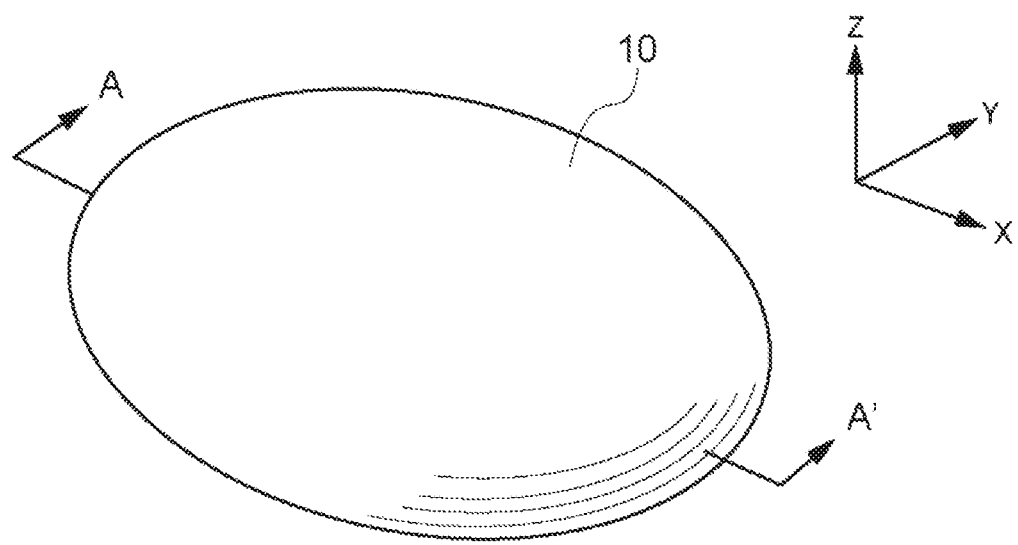
FIG. 1A is a perspective diagram illustrating an outer appearance of a shaped object of an embodiment.

FIG. 1A is a perspective diagram illustrating an outer appearance of a shaped object 10 of the present embodiment. The shaped object 10 of the present embodiment has a profile similar to a rugby ball. It should be noted that a profile of the shaped object of the present disclosure and a profile of the shaped object that is to be shaped by the present disclosure are not limited to the profile illustrated in FIG. 1, and they may be applied to any shape, for example a hexahedron, a sphere, a hollow structure, a ring structure, a horseshoe type, and the like.

Figure 1B:
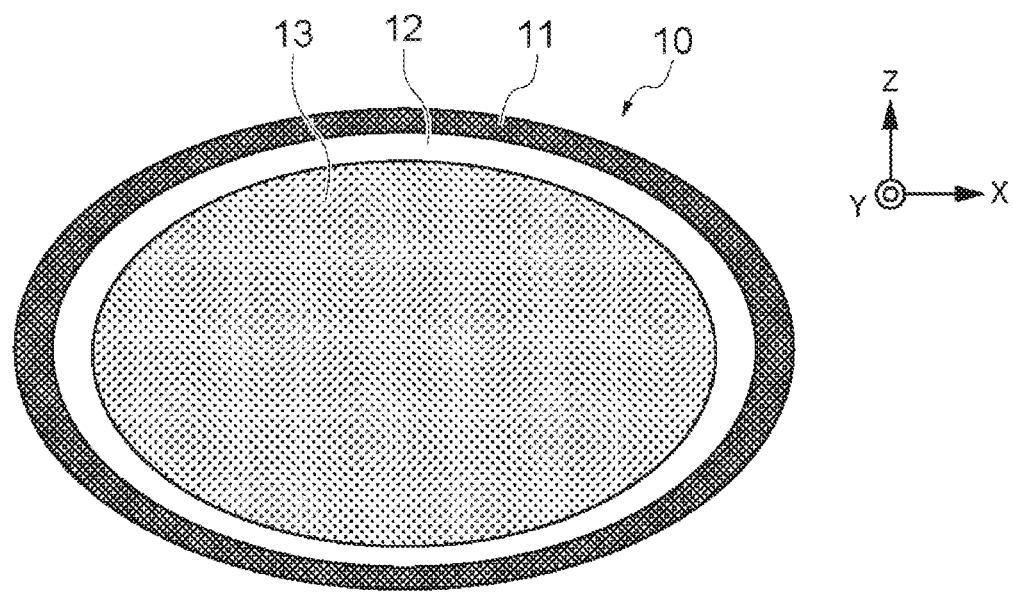
FIG. 1B is a cross-sectional diagram in an arrow view along a section line A-A' indicated in FIG. 1A.

FIG. 1B is a cross-sectional diagram in an arrow view along a section line A-A' illustrated in FIG. 1A. A cross section of the shaped object 10 illustrated in FIG. 1B is a cross section along an XZ plane, at a center position of the shaped object 10 in an XYZ coordinate system illustrated in FIG. 1A.

The shaped object 10 includes a color region 11 formed from a surface layer side (outer peripheral side) toward an inner side (center portion side) by ink (color ink) containing a colorant, a light reflective region 12 formed by ink having light reflectance, and a body region 13.

Figure 2:
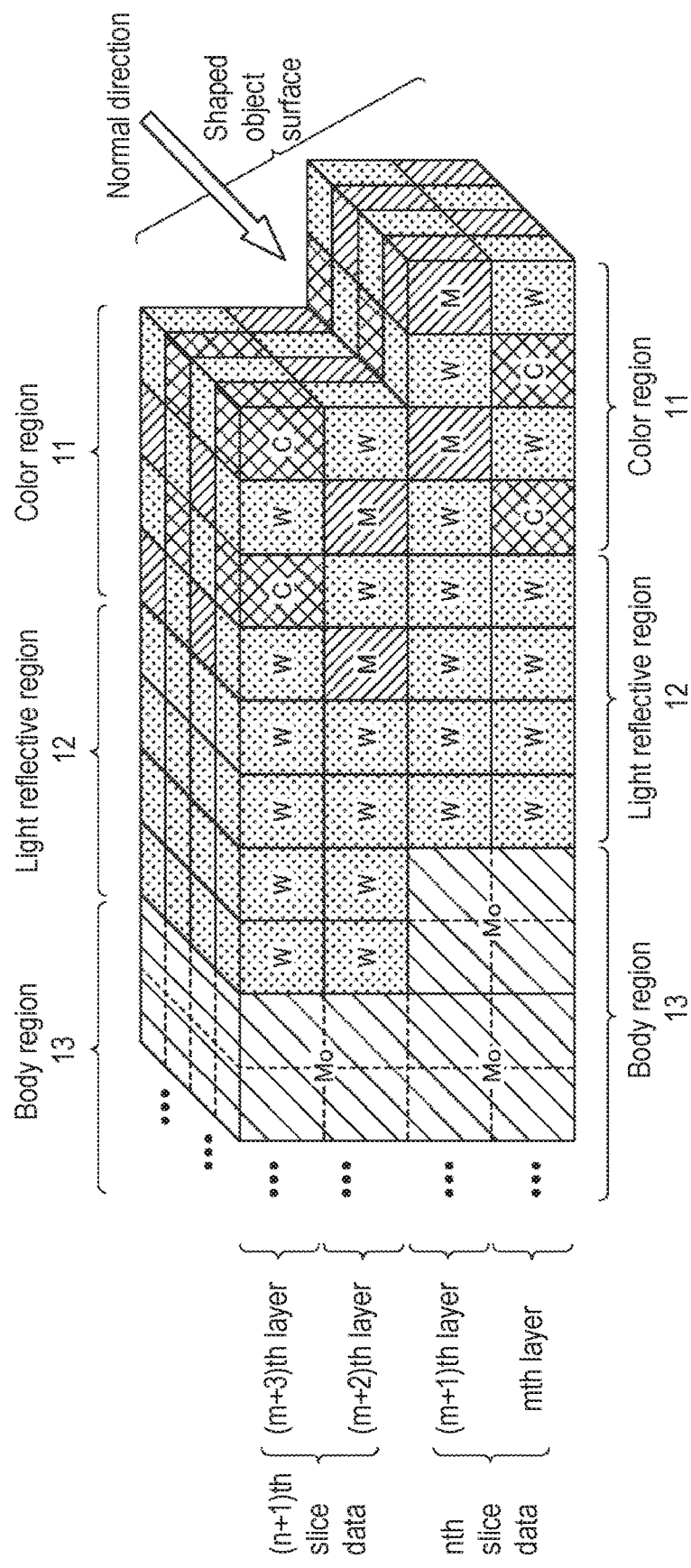
FIG. 2 is a schematic arrangement of ink droplets or voxels of different types in a cross section along an XZ plane, at a center position of the shaped object in an XYZ coordinate system illustrated in FIG. 1A.

FIG. 2 is a schematic diagram that enlarges and illustrates a portion of the shaped object illustrated in FIG. 1A near its middle portion. In FIG. 2, each cube illustrates one droplet of ink to be ejected from an inkjet, or one voxel configured by a minimum unit of data. The body region 13 may be given a larger ejecting amount than the color ink, or a doubled number of heads therefor may be arranged to increase shaping speed when a noncolored shaped object is to be shaped.

FIG. 2 illustrates a configuration in which four layers are layered atop each other. An mth layer and an (m+1)th layer are layers formed based on nth slice data, and an (m+2)th layer and an (m+3)th layer are layers formed based on (n+1)th slice data. A thickness of each layer in a Z direction (vertical direction in the drawing) is of a value primarily suitable for multicolor forming using subtractive color mixing for the color region 11 within a range of 5 μm to 50 μm and a preferable range for a case of forming the layers with ultraviolet curing ink using an inkjet method is for example 10 μm to 40 μm.

When seen along a normal direction of a surface of the shaped object 10, the color region 11 and the light reflective region 12 have constant thicknesses within a range of 50 μm to 600 μm that is, for example the color region 11 being of 200 μm and the light reflective region 12 being of 500 μm. These thicknesses may differ depending on desired resolution and ink density, and for example, if the resolution is 1,200 dpi, the thickness may be 50 μm or less, and if the resolution is 300 dpi, the thickness may be 600 μm or more. The color region 11 is formed by the color ink. The color ink includes yellow (Y), magenta (M), cyan (C), and black (K); however, no limitation is made hereto, and flaming colors of (Y), (M), (C), and (K), respectively, red (R), green (G), blue (B), or orange (Or) and the like may be added. Further, metallic, pearly, or fluorescent colors may also be used. Moreover, to obtain a transparent shaped object that does not have the color region 11 on its surface, transparent ink may also be included. To express desired color tones, one or more types of such color ink will be used.

Amounts of the color ink to be used for forming the color region 11 may differ depending on desired color tones (that should be expressed). For a case of a low-density and bright color tone, ink in the color region 11 will not suffice to satisfy a predetermined ink density by a sole use of the color ink, and especially when an expressed color is white, there is no color ink, and the density thereof becomes zero. As a result, there may be incidents where dents and bumps are formed heightwise in the Z direction, or dents with no color ink are formed along X and Y directions. In either of these cases, the shaped object to be formed by the layering scheme as in the present embodiment will come to have undesirable occurrences of dents and bumps, and this is not desirable.

In the present embodiment, at a portion where the ink in the color region 11 does not satisfy the predetermined ink density by the sole use of the color ink, the ink density of the color region 11 is supplemented by white supplementary ink. That is, the color region 11 is formed so that a total density (number of ink droplets) of the color ink and the supplementary ink becomes constant regardless of positions within the color region 11. Due to this, the aforementioned occurrences of dents can be avoided, and a profile of the shaped object 10 can be shaped precisely.

FIG. 2 illustrates an example of the color region 11 that has expressed "blue" by mixing "C (cyan)" and "M (magenta)". In this example, "C (cyan)" and "M (magenta)" are arranged in the color region 11 by a predetermined pattern for expressing "light blue"; however, the color region 11 has less ink densities of "C (cyan)" and "M (magenta)" corresponding to amounts by which "C (cyan)" and "M (magenta)" are "light". In each gap where the color ink is not arranged in the color region 11, "W (white)" ink (corresponding to "supplementary ink" or "white ink" of the present disclosure) is arranged therein. It should be noted that, since striking positions and ejecting amounts of the color ink are known beforehand, a supplementing amount and a supplementing position (striking position) of the supplementary ink can be determined by taking the above into consideration.

The light reflective region 12 is a region formed by the "W (white)" ink having the light reflectance, and it has light reflectance that reflects an entire spectrum of visible light, which has entered from a color region 11 side, back toward the color region 11 side. By forming the light reflective region 12 with the white ink, the light that has entered from the surface of the shaped object 10 can suitably be reflected by the light reflective region 12, and coloring by the subtractive color mixing can be realized.

In the present embodiment, same ink is used as the "W (white)" ink used for the light reflective region 12 and the "W (white)" ink used for the color region 11. In the present embodiment, the "W (white)" ink has 60% visible light transmittance so that the same white ink can be used for supplementing the color region 11 and for the light reflective region 12. That is, by ensuring the light transmittance, the reflection of light at the light reflective region 12 is enabled by setting the light transmittance to be not so high while securing light permeation through the color region 11.

It should be noted that, if the light transmittance is high, the thickness of the light reflective region 12 can be increased to secure the light reflection performance. If the light transmittance becomes too high, the light permeates through the light reflective region 12, resulting in less reflected light that would make the shaped object 10 appear darker in color; however, the light transmittance can be determined by taking a balance with the thickness of the light reflective region 12 that can be ensured within the shaped object 10 into consideration, within a range by which the light transmittance does not become too high. In the present embodiment, the visible light transmittance is set to 60%; however, a suitable value within a range of 20% to 70% can be set.

The body region 13 arranged on an inner side of the light reflective region 12 is a region that defines the profile of the shaped object 10. Since the body region 13 cannot be seen from outside, any material may be used. Normally, a material cheaper than the color ink is used. Further, the white ink that is same as the one for the light reflective region 12 may be used, in which case an inkjet head for ejecting the shaping material can be omitted.

[Configuration of Shaping Device]

Figure 3A:
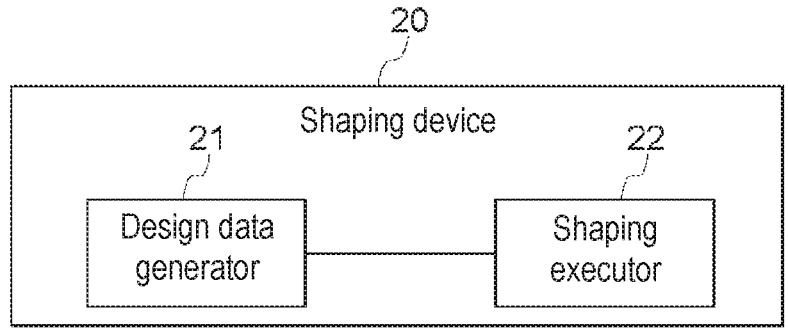
FIG. 3A is a diagram illustrating a configuration of a shaping device of an embodiment.

Next, a shaping device 20 for shaping the shaped object as explained above will be described. FIG. 3A is a diagram illustrating a configuration of the shaping device 20 of the present embodiment. The shaping device 20 includes a design data generator 21 configured to generate design data, and a shaping executor 22 configured to form the shaped object by layering the UV ink according to the design data. The design data generator 21 has a function to obtain ink information regarding which color of ink should be arranged at a position in which layer, so as to configure the shaped object 10 having the color region 11 having the constant thickness as aforementioned, for example, from data of an outer appearance obtained by imaging the shaped object to be shaped. The detailed configuration of the design data generator 21 will be described later.

Figure 3B:
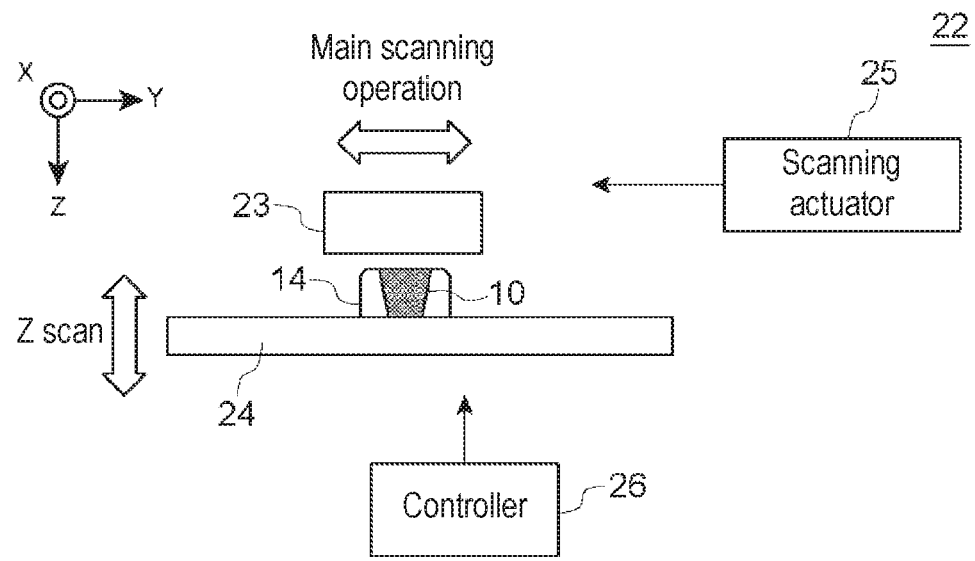
FIG. 3B is a diagram illustrating a configuration of a shaping executor.

FIG. 3B is a diagram illustrating a configuration of the shaping executor 22. The shaping executor 22 is a device that shapes a three-dimensional shaped object 10 using the layered shaping method by ejecting the UV ink. The shaping executor 22 includes a head unit 23, a shaping stage 24, a scanning actuator 25, and a controller 26.

The head unit 23 is a section for ejecting the UV ink that is to become a material of the shaped object 10, and forms respective layers configuring the shaped object 10 by curing the ejected UV ink and layering it. The head unit 23 includes a plurality of inkjet heads 30, a flattening roller 32, and ultraviolet light sources 31.

Further, the head unit 23 can form a support layer 14 around the shaped object 10. The support layer 14 is a layered structure for supporting the shaped object 10 by surrounding a periphery of the shaped object 10 during shaping, for example. The support layer 14 is formed as needed upon the shaping of the shaped object 10, and is removed after completion of the shaping. Specific configurations of the head unit 23 will be described later in detail.

The shaping stage 24 is a mounting stage member for mounting the shaped object 10 during the shaping, and is arranged at a position facing the inkjet heads 30 of the head unit 23. Further, the shaping stage 24 has a configuration that can move at least its top surface up and down in a layered direction, and moves at least the top surface by being driven by the scanning actuator 25 in accordance with progression of the shaping of the shaped object 10. In this example, the layered direction is a direction (Z direction in the drawings) that intersects perpendicularly to a main scanning direction (Y direction in the drawings) and a sub scanning direction (X direction in the drawings) that are preset in the shaping executor 22.

The scanning actuator 25 is an actuator for causing the head unit 23 to perform a scan operation of a relative movement with respect to the shaped object 10. As the scan operation, the scanning actuator 25 causes the head unit 23 to perform a main scanning operation (Y scan), a sub scanning operation (X scan), and a layered direction scan (Z scan). Here, the main scanning operation is an operation to eject the UV ink by the head unit 23 while moving the head unit 23 in the main scanning direction (Y direction). Further, upon the main scanning operation, the scanning actuator 25 rotates the flattening roller 32 of the head unit 23, makes it contact a top surface of the ejected UV ink to flatten the UV ink to uniformize a thickness of the UV ink to a thickness of one layer (Z direction). Moreover, the scanning actuator 25 further drives the ultraviolet light sources 31 of the head unit 23. Specifically, the scanning actuator 25 turns on the ultraviolet light sources 31 during the main scanning operation to cure the ejected UV ink.

The sub scanning operation is an operation to relatively move the head unit 23 in the sub scanning direction (X direction) with respect to the shaping stage 24. The sub scanning operation may be an operation that moves the head unit 23 relatively with respect to the shaping stage 24 by a preset feed amount. The scanning actuator 25 causes the head unit 23 to perform the sub scanning operation, for example in between main scanning operations, by fixing a position of the head unit 23 in the sub scanning direction while moving the shaping stage 24.

The layered direction scan is an operation of relatively moving the head unit 23 with respect to the shaping stage 24 in the layered direction (Z direction). The scanning actuator 25 causes the head unit 23 to perform the layered direction scan for example by moving at least one of the head unit 23 and the shaping stage 24 in the layered direction. In this example, the scanning actuator 25 moves the shaping stage 24 (by lowering it in the Z direction) while fixing the position of the head unit 23 in the layered direction. Due to this, a distance between the flattening roller 32 of the head unit 23 and the shaping stage 24 is changed (by an amount corresponding to the thickness of one layer).

The controller 26 is for example a CPU of the shaping executor 22, and it is configured to control operations for shaping the shaped object 10 by controlling respective members of the shaping executor 22. It should be noted that the CPU of the shaping executor 22 may be same one as a CPU of the design data generator 21. The controller 26 controls the respective members of the shaping executor 22 according to design data generated by the design data generator 21. Due to this, the shaping executor 22 layers the material used for the shaping in the layered direction, and shapes the shaped object 10 by using the layered shaping method.

Figure 3C:
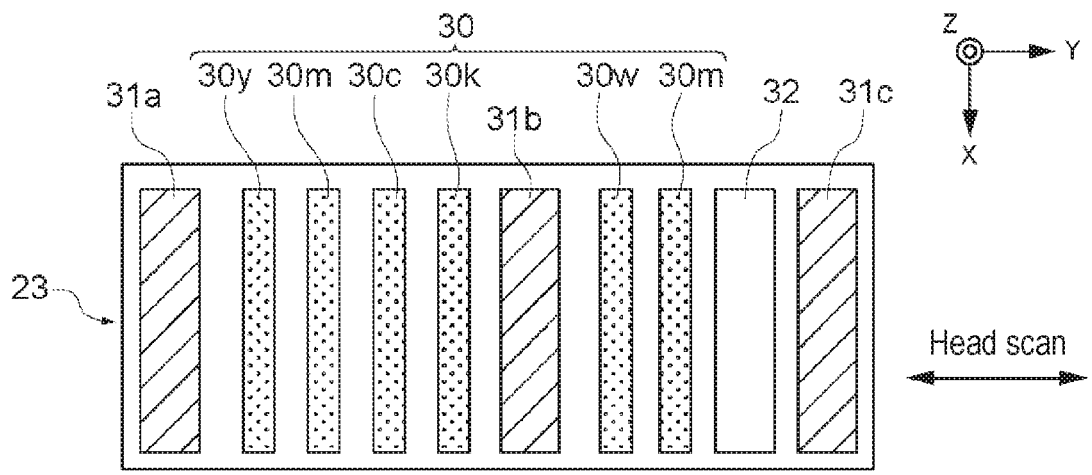
FIG. 3C is a diagram illustrating an example of a detailed configuration of a head unit.

FIG. 3C is a diagram illustrating one example of a detailed configuration of the head unit 23. The head unit 23 includes the inkjet heads 30 that eject the color ink and the shaping material. As the color inkjet heads, an inkjet head 30y that ejects the yellow ink, an inkjet head 30m that ejects the magenta ink, an inkjet head 30c that ejects the cyan ink, an inkjet head 30k that ejects the black ink, and an inkjet head 30w that ejects the white ink are provided (hereinbelow, these are collectively called "color inkjet heads 30y to 30w"). It should be noted that, an arrangement order and numbers of the color inkjet heads 30y to 30w are not limited to the one illustrated in FIG. 3C. It should be noted that, although it is not illustrated in FIG. 3C, if the support material is to be used, an inkjet head for the support material may be arranged between the ultraviolet light source 31b and the flattening roller 32. Furthermore, an inkjet head for the transparent ink may be arranged at this same position for purposes such as to shape a shaped object 10 at least a part of which is transparent, or to protect the surface of the shaped object 10 by a transparent film.

The head unit 23 includes ultraviolet light sources 31a to 31c. The ultraviolet light source 31a and the ultraviolet light source 31c are arranged at respective ends of the head unit 23. The ultraviolet light source 31b is arranged between the inkjet head 30k and the inkjet head 30w. Further, the head unit 23 includes the flattening roller 32. The flattening roller 32 uniformizes the thickness (Z direction) of the ink ejected from the inkjet heads 30 to a constant thickness.

Figure 4:
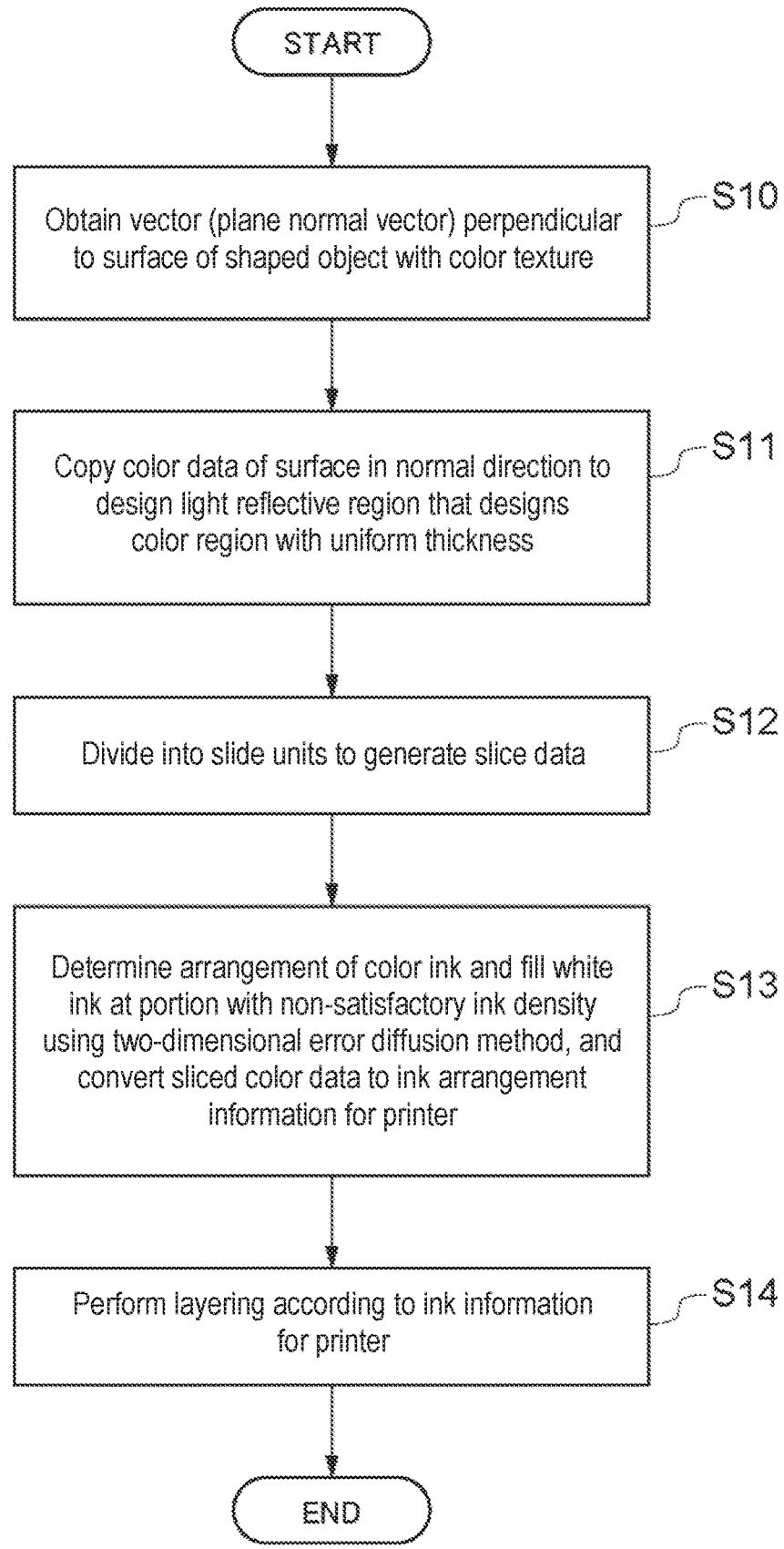
FIG. 4 is a diagram illustrating an operation to shape a shaped object using the shaping device of the present embodiment.

FIG. 4 is a diagram illustrating an operation of shaping a shaped object using the shaping device of the present embodiment. Step S10 to step S13 are an operation of the design data generator 21, and step 14 is an operation of shaping process.

Figure 5A:
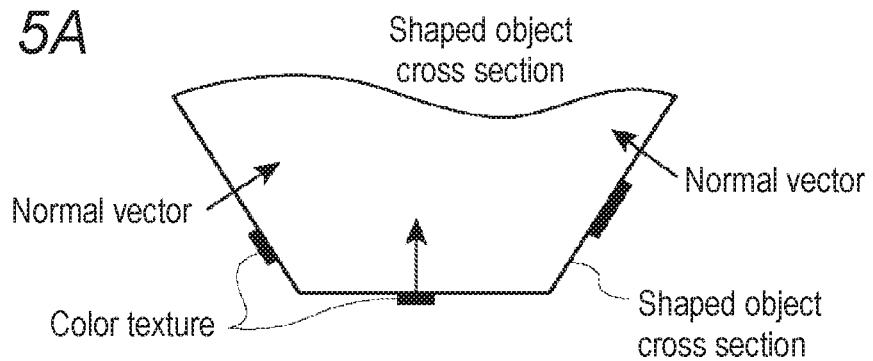
FIG. 5A, FIG. 5B, FIG. 5C, and FIG. 5D are diagrams illustrating examples of design data generated by the operation illustrated in FIG. 4.

The design data generator 21 firstly obtains a vector (plane normal vector) perpendicular to the surface of the shaped object having a color texture from an appearance profile and image data and the like of the shaped object to be shaped (S10). FIG. 5 illustrates an example of the design data generated by the operation illustrated in FIG. 4. FIG. 5A is a diagram illustrating an example in which normal vector is obtained on the surface of the shaped object having color textures.

Figure 5B:
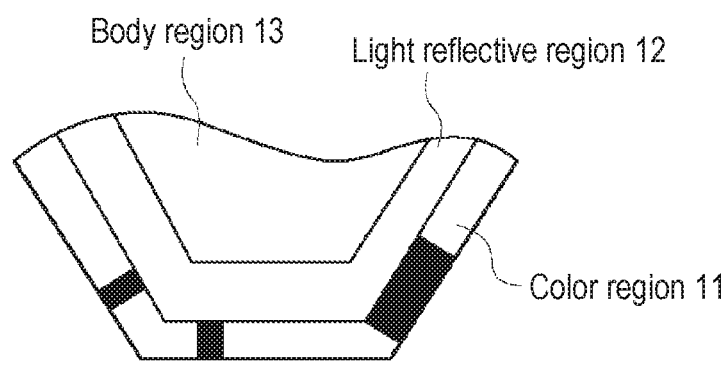

Next, the design data generator 21 copies the color data of the shaped object surface in the normal direction to generate a color region 11 having a constant thickness. Further, the design data generator 21 generates a light reflective region 12 on an inner side of the color region 11 (S11). FIG. 5B is a diagram illustrating a state in which the color region 11 and the light reflective region 12 are generated.

It should be noted that making the thickness of the color region 11 constant means for example to make the thickness of the color region 11 constant along the normal direction of the shaped object surface except at some exceptional positions. In this case, depending on a profile of the shaped object 10 to be shaped, a part of the color region 11 may have a thickness that is outside an allowable range. For example, as illustrated in FIG. 5B, in a case of shaping the shaped object 10 having a profile in which its lower surface and side surface intersect, in a vicinity of a region where normal lines of the lower surface and the side surface intersect, the thickness of the color region 11 in the normal direction is allowed to deviate from the constant thickness. Further, in a case where the thickness of the shaped object 10 is thin, and the thickness of the color region 11 cannot be ensured, the color region 11 is allowed to be thin.

Figure 5C:
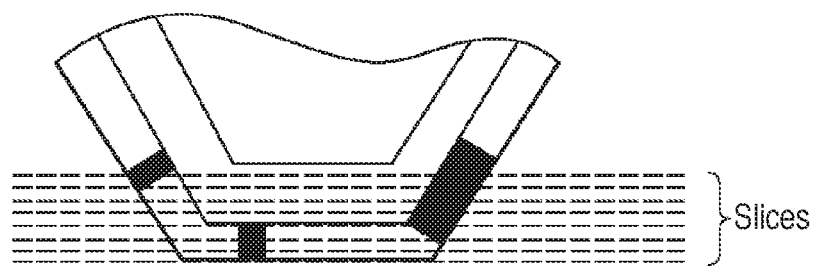
Figure 5D:
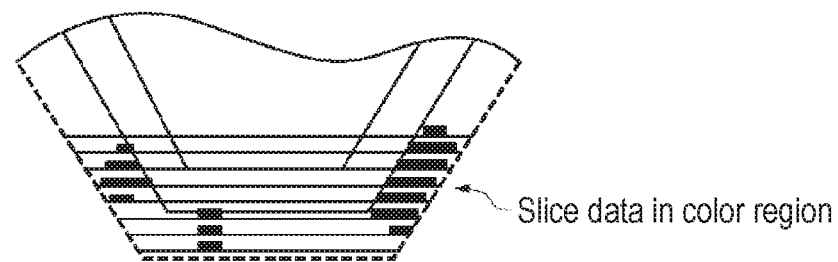

Next, the design data generator 21 generates slice data by performing divisions in slice units (S12). FIGS. 5C and 5D are diagrams illustrating that a shaped object in which the color region 11 is defined is divided in the slice units to obtain the slice data. The slice data defines which portion in each slice is the color region 11 and which portion therein is the light reflective region 12, and it further defines regarding the color region 11 as to which portion is to be which color.

The design data generator 21 determines the arrangement of the color ink using the two-dimensional error diffusion method and the like for the color region 11 in each slice, supplements the white ink at portions where the ink density is not satisfied, and converts the sliced color data to ink arrangement information for a printer (S13).

Next, the shaping executor 22 repeats a process of ejecting the UV ink from the inkjet heads 30 to layer it according to the ink arrangement information generated by the design data generator 21, and shapes the shaped object 10 (S14).

Further, as an example, the ink droplets of the white ink for the light reflective region 12 and the body region 13 may be made relatively larger than the ink droplets of the colored ink. Due to this, high precision colors with fine pixels can be expressed in the color region 11.

Effects of Embodiments (1) The shaped object 10 of the present embodiment is a shaped object 10 formed by using the layering scheme, including: the color region 11 having the uniform thickness along the normal direction from the surface toward the inside of the shaped object 10; and the light reflective region 12 arranged on the inner side of the color region 11, and at the portion where the ink in the color region 11 does not satisfy the predetermined ink density by the sole use of color ink, the ink density of the color region 11 is supplemented with the white ink.

As above, by supplementing the portion, where the ink in the color region 11 does not satisfy the predetermined density by the sole use of the color ink, by the white ink, the undesirable occurrence of the deteriorated color tone in the shaped object caused by the dents, bumps, and gaps in the color region 11 which may be generated due to the insufficiency of the ink density can be prevented. Further, by using the ink that is the same as the ink configuring the light reflective region 12 or the body region 13 as the supplementary ink, the materials can be commonalized. The thickness of the color region 11 stays uniform even in the configuration that fills the same white ink in the light reflective region 12 and the color region 11, and as such, the color quality of the shaped object 10 can be maintained uniformly.

(2) The white ink has the function to shield off light, and concentrated white color may hinder a color of the color region 11 from being seen; however, in the shaped object 10 of the present embodiment, since the white ink having 60% or more light transmittance is used, the influence imposed on the color of the color region 11 can be mitigated. By using the white ink having 60% light transmittance, the white ink that is identical to the supplementary ink can suitably be used in the light reflective region 12.

(3) The shaping method of the present embodiment is a method of shaping the shaped object 10 provided with the color region 11 having the uniform thickness along the normal direction from the surface toward the inside thereof using the layering scheme, and the method includes supplementing the ink density of the color region 11 using the white ink at the portion where ink in the color region 11 does not satisfy the predetermined ink density with the sole use of the color ink.

As above, by supplementing the portion, where the ink in the color region 11 does not satisfy the predetermined ink density by the sole use of the color ink, by the white ink, the undesirable occurrence of the deteriorated appearance profile and color tone in the shaped object caused by the dents, bumps, and gaps in the color region 11 which may be generated due to the insufficiency of the ink density can be prevented. Further, with the ink which is the same white ink configuring the light reflective region 12 being used as the supplementary ink, the types of materials can be commonalized, and the inkjet head 30w which ejects the supplementary ink can be commonalized.

(4) In the present embodiment, since the white ink having 60% light transmittance is used, the influence imposed on the colors in the color region 11 can be mitigated, and the white ink that is the same as the supplementary ink can suitably be used for the light reflective region 12.

INDUSTRIAL APPLICABILITY

The present disclosure can prevent undesirable occurrences such as deterioration of color tones and can commonalize the material, and thus is useful as a shaping method and the like for shaping using a layering scheme.

What is claimed is:

1. A shaped object formed by using a layering scheme, the shaped object comprising:
   a color region having a uniform thickness along a normal direction from a surface toward an inside of the shaped object; and
   a light reflective region arranged on an inner side of the color region,
   wherein, at a portion of the color region where an amount of ink would not satisfy a predetermined ink amount if the color region is formed by a sole use of color ink, the amount of ink is supplemented with white ink to be the predetermined amount,
   a thickness of each of a plurality of layers of the shaped object is substantially equal to each other, the each of the plurality of layers extending in a particular direction,
   a portion of the each of the plurality of layers, where a particular color other than white is expressed by arranging one or more color inks other than white ink and which is the surface of the shaped object in a direction other than a direction parallel or perpendicular to the particular direction, comprises a first portion where the one or more color inks are formed in the normal direction, and a second portion different from the first portion, the second portion being formed with the white ink in the normal direction, and
   the shaped object as a whole is formed with the plurality of layers.

2. The shaped object according to claim 1, wherein the supplementary ink is same ink that configures the light reflective region.

3. The shaped object according to claim 1, further comprising:
   a body region arranged on an inner side of the light reflective region,
   wherein the supplementary ink is same ink that configures the body region.

4. The shaped object according to claim 1, wherein ink with 20% to 70% light transmittance of visible light is used as the white ink.

5. The shaped object according to claim 2, further comprising:
   a body region arranged on an inner side of the light reflective region,
   wherein the supplementary ink is same ink that configures the body region.

6. The shaped object according to claim 2, wherein ink with 20% to 70% light transmittance of visible light is used as the white ink.

7. The shaped object according to claim 3, wherein ink with 20% to 70% light transmittance of visible light is used as the white ink.

8. The shaped object according to claim 5, wherein ink with 20% to 70% light transmittance of visible light is used as the white ink.

9. A shaped object formed by using a layering scheme, the shaped object comprising a plurality of layers, a thickness of each of the plurality of layers being substantially equal to each other, wherein
   at least one of the plurality of layers comprises a color region and a light reflective region arranged on an inner side of the color region, the color region having a uniform thickness along a normal direction from a surface toward an inside of the shaped object, and
   the color region comprises a region where a particular color other than white is expressed by arranging one or more color inks other than white ink, the region comprising:
   a first portion consisting of the one or more color inks and having a dent; and
   a second portion consisting of white ink filled in the dent.

10. The shaped object according to claim 9, wherein the white ink in the second portion has 60% or more light transmittance.

11. The shaped object according to claim 9, wherein the light reflective region comprises same ink as the white ink in the second portion.

\* \* \* \* \*